PATENTED DEC. 3 1867

Theo. Grundmann's Distilling Apparatus.

№ 71744

Witnesses:

Inventor:

United States Patent Office.

THEODORE GRÜNDMANN, OF CLEVELAND, OHIO.

Letters Patent No. 71,744, dated December 3, 1867.

IMPROVED DISTILLING-APPARATUS.

The Schedule referred to in these Letters Patent and making part of the same.

TO ALL WHOM IT MAY CONCERN:

Be it known that I, THEODORE GRÜNDMANN, of Cleveland, in the county of Cuyahoga, and State of Ohio, have invented a new and improved Distilling-Apparatus; and I do hereby declare that the following is a full, clear, and exact description thereof, which will enable others skilled in the art to make and use the same, reference being had to the accompanying drawings, forming part of this specification.

Similar letters of reference indicate corresponding parts.

This invention relates to a new and simple device for distilling, condensing, and cooling mash, beer, cider, volatile oil, or other suitable liquids, adaptable more particularly for distilling on a small scale.

The invention consists in arranging above the retort a small vessel, into which the vapors pass, and whence they are conducted to the cooler. This small vessel communicates, by means of two pipes, with the retort, to prevent the overboiling of the liquid in the retort, thereby producing much more and purer alcohol from the same amount of mash than could be produced by the apparatus now in use. The cover of the small vessel is made hollow, so that water can be held in it to cool the vapors, and to condense those that are not quite pure.

Figure 1:
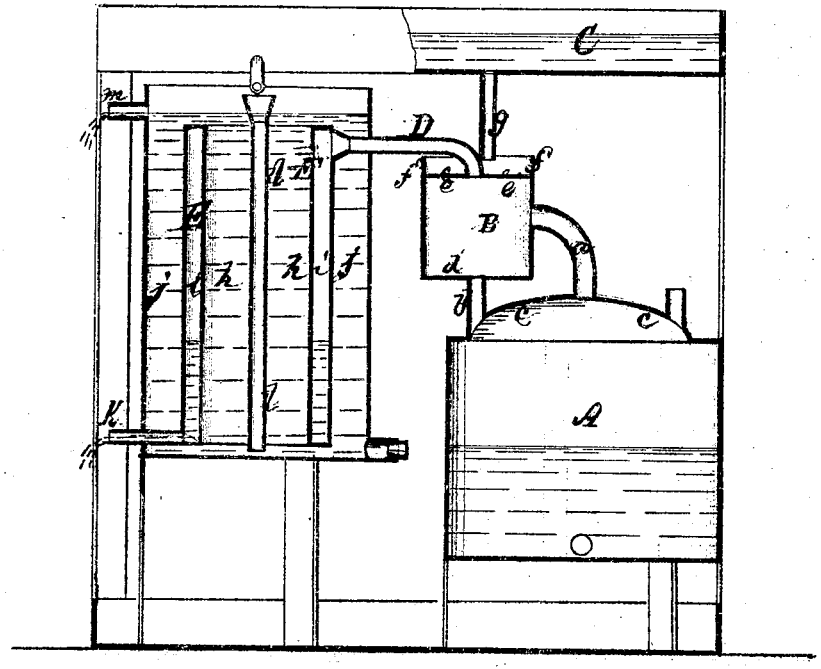
Figure 1 represents a sectional elevation of my improved distilling-apparatus.
Figure 2:
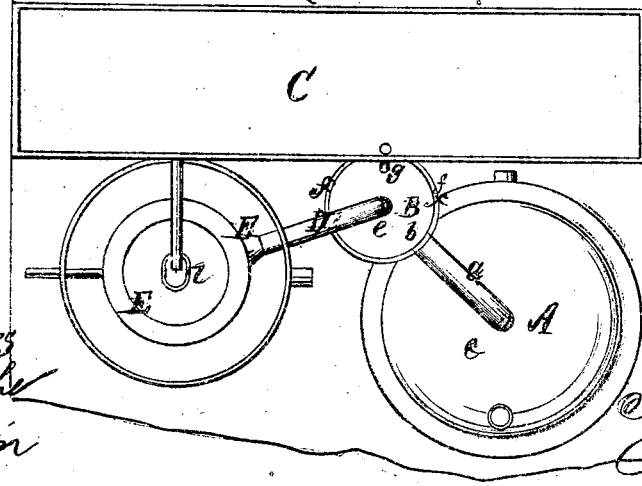
Figure 2 is a plan or top view of the same.

A represents a retort made of suitable material. B is a small vessel arranged above the retort, and communicating with the same by means of two pipes, $a$ and $b$. The pipe $a$ extends from the centre of the dome-shaped cover, $c$, of the retort, to the side of the vessel B, its end entering the vessel B about midway between the cover and bottom of the same, as shown in fig. 1. The other pipe, $b$, reaches from a lower part of the cover $c$ to the bottom, $d$, of the vessel B.

Any vapors arising from the retort enter the upper part of the vessel B through the pipe $a$, while those that have been condensed again in the vessel B return to the retort through the pipe $b$.

If the heat under the retort is too strong, so that the liquid overboils in the retorts, it will enter the vessel B through one or both the pipes $a$ and $b$, and will remain therein until it is cooled off. The exposing the liquids to the atmosphere when they overboil, as is usually done in ordinary retorts, is by this arrangement avoided, and the consequent waste of material.

The cover $e$ of the vessel B is made concave, or is surrounded by a ring, $f$, so as to form an open vessel or pan, into which water can be made to flow from a reservoir, C, through a pipe, $g$. The covering-plate of the vessel B will thereby be cooled, and the vapors not light enough to pass directly off to the cooler are again condensed and returned to the retort. Thereby none but the pure vapors will be retained for further condensation in the cooling-apparatus.

D is a pipe connecting the upper part of the vessel B with a suitable cooler, E.

The cooler may be of suitable construction. That represented in the drawing consists of three vessels, $h$, $i$, and $j$, arranged one within the other, $i$ being the cooling-space, the water or cooling-liquid circulating around it in $h$ and $j$.

The condensed pure alcohol is drawn off the vessel $i$ through a pipe, $k$.

The water is, by a pipe, $l$, brought to the lower part of the vessels $h$ and $j$, and, rising, flows off from their upper part through a pipe, $m$.

I claim as new, and desire to secure by Letters Patent—

1. The vessel B, when connected with the upper part of the retort by means of pipes $a$ and $b$, and when provided with a dish-shaped cooling-cover, $e$, substantially as and for the purpose herein shown and described.

2. The retort A and vessel B, when made and arranged as set forth, in combination with a cooler, E, as described.

THEODORE GRÜNDMANN.

Witnesses:
FRED'K A. BRAND,
FRED'K S. SMITH.